Dec. 13, 1949   T. A. RICH   2,491,335
OPINION METER
Filed April 29, 1947   2 Sheets-Sheet 1
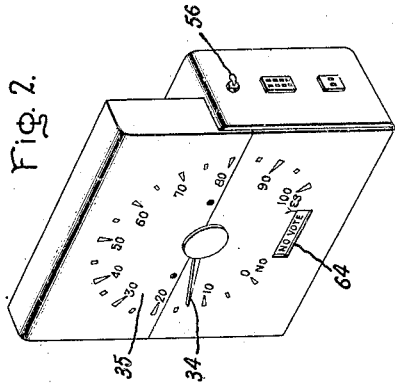
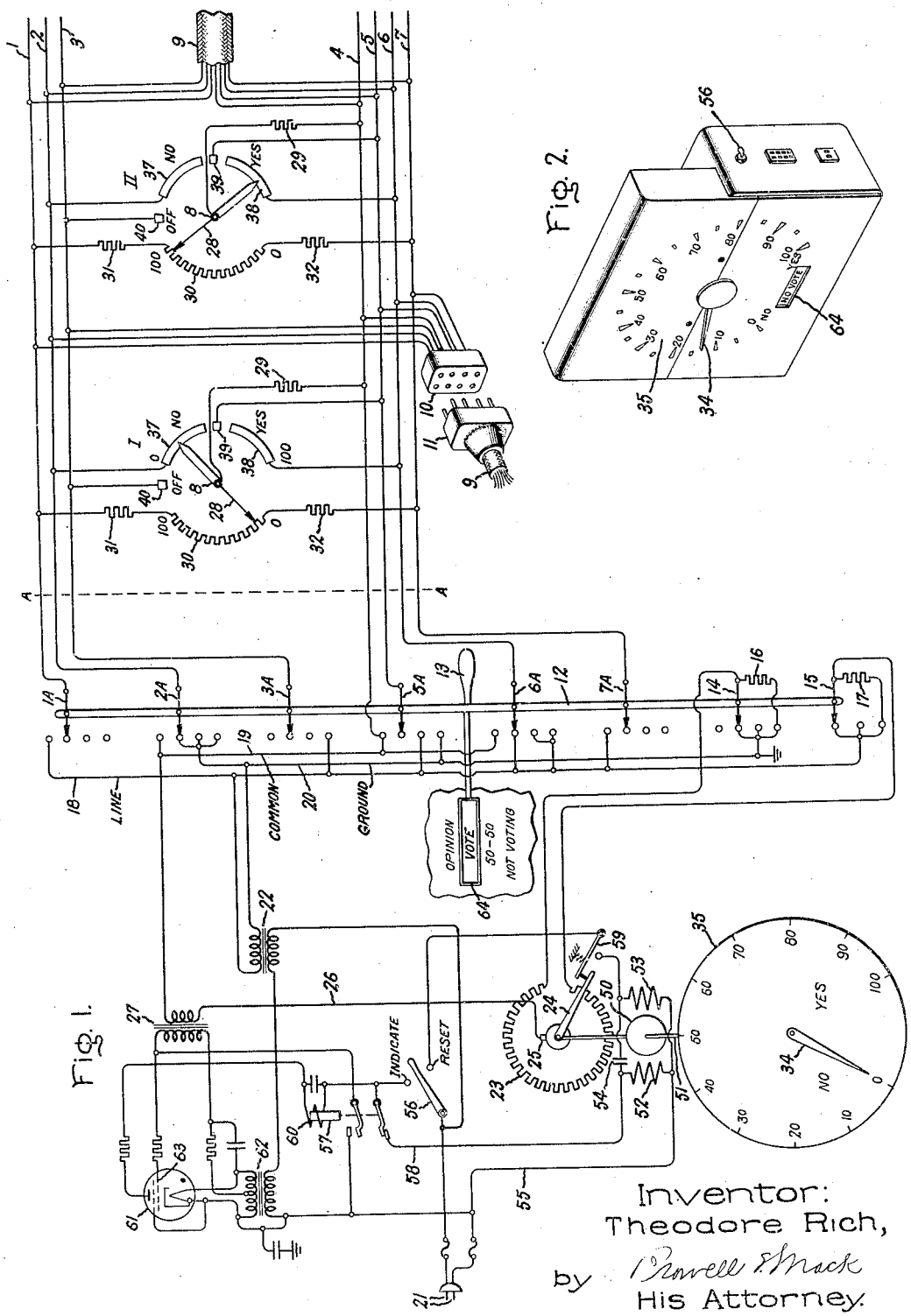
Inventor:
Theodore Rich,
by Powell & Mack
His Attorney.

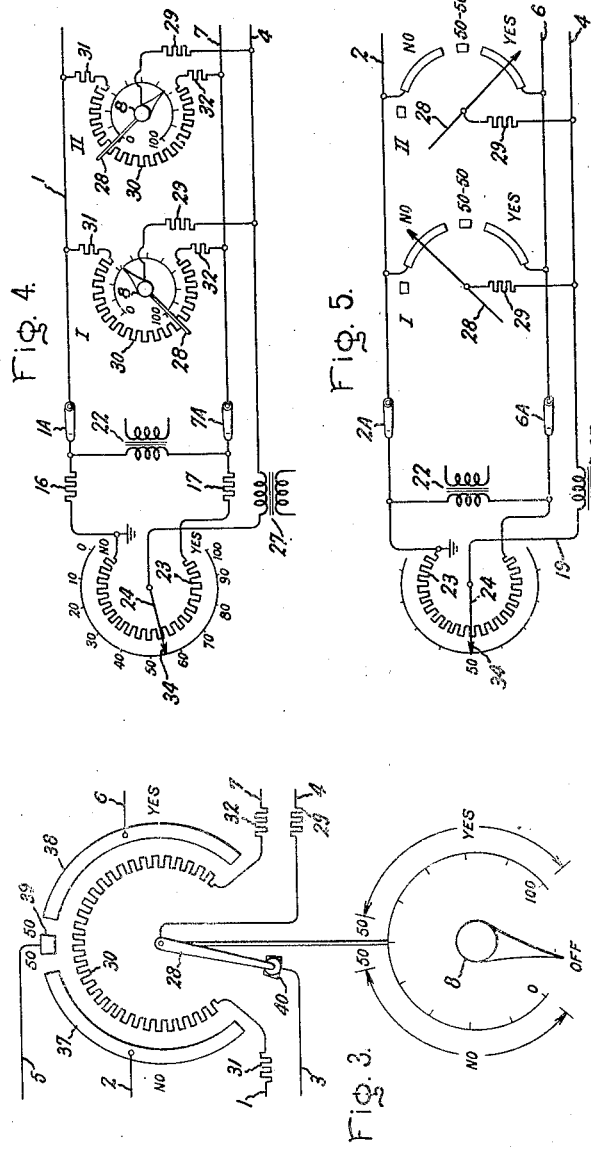

Patented Dec. 13, 1949

2,491,335

UNITED STATES PATENT OFFICE 2,491,335

OPINION METER

Theodore A. Rich, Schenectady, N. Y., assignor to General Electric Company, a corporation of New York Application April 29, 1947, Serial No. 744,650

9 Claims. (Cl. 235—52)

1

My invention relates to an electrically operated voting system and apparatus of a portable character which may be quickly set up in an auditorium, a studio, a classroom, and the like, to obtain quickly secret balloting of the audience with respect to questions on which balloting is desired. My apparatus not only provides for "Yes" and "No" votes but provides for obtaining a weighted measurement between affirmative and negative opinions of those voting, a measurement of "on the fence" votes, and a measurement of those not voting at all. The indicated results of any vote are expressed in percentage, and the apparatus employs a bridge measuring principle and hence readily adapts itself to audiences of any size, and the balloting measurement results are independent of variations in voltage of the source of the electrical supply used.

By the use of my invention, groups of people are better enabled to ascertain their joint opinions, to reach common agreements and to speed up decisions. When a question is before a group of people, there is usually a minimum of four measurements needed. The first of these is the number who abstain from voting, either because the question is meaningless to them or because they do not have sufficient information to come to any decision. The second feature is measurement of those who are "on the fence" between "Yes" and "No". The third and conventional feature is the division of "Yes's" and "No's". The fourth feature provided by my invention is called a measurement of opinion, which enables a weighted vote to be obtained. In many areas of discussion a simple division of "Yes" and "No" is not adequate. For instance, say that 60 per cent of a group are mildly in favor of a proposition but the remaining 40 per cent are violently opposed. These degrees of opinion would not be shown by a "Yes" and "No" ballot. With my apparatus the voter has a scale on which to indicate the intensity of his opinions, where 0 would indicate a violent "No" and 100 a violent "Yes". The scale is continuously divisible and the voter can pick a number which represents the intensity of his convictions with 50-50 representing "on the fence". The result of a group ballot is the average of individual settings. In the example mentioned where 60 people were mildly in favor and 40 violently opposed, 60 people might set their individual voting devices to 60 per cent "Yes" on the scale and 40 people would set theirs at 0 on such scale. The composite opinion ballot would come out 36 per cent favorable, whereas the "Yes" and "No" vote would come out 60 per cent favorable.

With my apparatus it is possible to obtain the four aspects of group opinion previously mentioned in less than a minute, whereas it would take a considerable length of time to obtain comparable data by means of written ballots. The opinion measurement feature avoids the possibility of having the chairman of a meeting inaccurately sum up the composite opinion of a group after only a scattered few of the group have voiced their opinions.

In carrying my invention into effect, I employ a self-balancing resistance bridge circuit, two arms of which comprise a plurality of resistance potentiometers connected in parallel and the individual settings of which are controlled manually by the individual voters; the other two arms of the bridge comprise a master potentiometer which is controlled automatically to balance the bridge and indicate the balloting results after a vote has been taken. The individual voting potentiometers are so arranged that only one setting is necessary to enable all four of the previously mentioned balloting features to be measured separately and rapidly by switching circuit connections between the voting potentiometers and the master potentiometer. All individual voting is secret but the balloting results are clearly indicated for all to see.

The features of my invention which are believed to be novel and patentable will be pointed out in the claims appended hereto. For a better understanding of my invention reference is made in the following description to the accompanying drawing in which Fig. 1 represents the apparatus and wiring diagram of my system with only two voting stations being illustrated. Fig. 2 represents a portable carrying case which houses the measuring, controlling, and indicating apparatus of the system. Fig. 3 is a somewhat schematic and exploded view of one of the individual voting potentiometers. Fig. 4 represents the simplified connections used for opinion voting, Fig. 5 represents the simplified connections used for "Yes" and "No" voting, and Fig. 6 represents the simplified circuit connections used for a "50-50" vote, and by means of which the circuit connections for a "Not voting" measurement will also be explained.

Referring now to Fig. 1, to the left of the line A—A there is represented the control, indicating and measuring apparatus which is housed in and on the portable carrying case of Fig. 2; and to the right of line A—A are represented two similar voting stations designated I and II, of which there can be any number up to several hundred. The individual voting stations each comprise a small combined resistance potentiometer and switch, with the live electrical parts suitably enclosed in an insulated casing of a size such as may be held in a person's hand and with a single external knob and pointer 8 for manual operation to different vote indicating positions by the voter. Each person in the audience desiring to take part in the voting will be provided with one of these vote signaling devices, and they will ordinarily be located at the several seats usually provided in a classroom or auditorium. Fig. 3 represents one of these voting devices in more detail. The vote signaling devices such as I and II are all connected in parallel by seven wires numbered from 1 to 7, inclusive, and usually contained in portable insulated flexible cables as indicated at 9, and the wiring system including any convenient number of plug-in sockets and matching terminals as represented at 10 and 11 to adapt the system to any desired number and location of such voting stations. The seven wires from the several voting stations extend to the control station, where the wires 1, 2, 3, 5, 6, and 7 are connected to the movable switch blades 1A, 2A, 3A, 5A, 6A and 7A of a gang switch 12. This gang switch has an operating handle 13 movable to any one of four positions designated "Not voting," "50—50," "Vote," and "Opinion"; and in these four positions the several switch blades make connection with stationary contacts some of which are connected to the control apparatus and with other stationary gang switch contacts in a manner to provide the desired different balloting connection combinations. The gang switch also includes movable switch blades 14 and 15 which in all but the "Opinion" position short circuit resistances 16 and 17, respectively, contained in the measurement bridge circuit to be explained.

Associated with the stationary contacts of the gang switch are three busbars or wires 18, 19, and 20 also designated "Line," "Common," and "Ground," indicating their use. The "Line" and "Ground" wires 18 and 20 are connected to the source of supply used. This source of supply may be either direct current or alternating current. In the present case a 110-volt, 60-cycle source of supply 21 is used and energizes the wires 18 and 20 through a transformer 22 which reduces the maximum voltage to be employed on the bridge system and the several voting stations to a safe value such, for example, as six volts above ground. The "Line" and "Ground" wires 18 and 20 are also connected across a master potentiometer resistance 23, either directly or through the resistances 16 and 17, depending upon the position of gang switch blades 14 and 15. The "Common" wire 19 is connected to the movable contact 24 of the potentiometer through a brush 25, wire 26, and primary winding of a thyratron control transformer 27. Common wire 19 is also connected to the wire 4 leading to all of the movable potentiometer contacts designated 28 at the several voting stations I, II, etc. Similar resistances 29 are included in the connections to the common wire 4 at the several voting stations.

While the master potentiometer at the control station could be balanced manually, it is preferable to do so automatically and for this purpose I have shown a reversible motor. The motor rotor 50 is indicated in Fig. 1 as being mounted directly on the shaft 51 of the potentiometer arm 24 but in practice a small high-speed motor will be used and geared down to shaft 51. Also on this shaft is the large pointer 34 of the vote indicator indicating on the large scale 35 graduated from 0 to 100 per cent. For A.-C. supply the motor will be of the alternating current type and may be a split-phase induction motor having field windings 52 and 53 and phase splitting condenser 54 with connections for alternately including the condenser 54 in series with either winding for reverse operation. One side of both field windings is connected directly to one side of the source of supply 21 through wire 55. The circuit to be energized for driving the motor forward or in the upscale direction is from the other side of source 21 through the upper contact (marked "Indicate") of a manual two-way switch 56, the lower contact of a relay operated switch 57, and wire 58. The circuit to be energized for reverse motor operation is through the lower contact (marked "Reset") of switch 56 and a limit switch 59. Limit switch 59 is biased to a closed position but is opened by potentiometer arm 24 when in the 0 or downscale position so as to stop the motor at the correct position when the pointer 34 is reset to the zero position. The relay switch 57 is biased to the down position with its lower contact closed and its upper contact open. Its energizing coil 60 is in the plate circuit of a gas-filled electron power tube 61 supplied from the source 21 and with its plate and cathode connected across such source when the switch 56 is in the up or "Indicate" position. Sixty-two (62) represents the filament heating transformer for the tube. There is a biasing connection from the secondary of the transformer 62 to the control grid 63 of the tube through the secondary of the bridge unbalance detector transformer 27. The bias afforded by this connection acting alone without current in the detecting transformer 27 is such as to just prevent the tube from firing and represents the normal condition with relay coil 60 deenergized and its upper contact open. As will be explained, the starting condition of the apparatus is with the balancing potentiometer arm 24 at the zero end of its resistance 23 and generally, therefore, with the bridge circuit unbalanced in a given direction, which would cause a current to flow in the primary of the detecting transformer 27. In making the connections, for instance the direction of connection of the primary transformer 27, care is taken to see that any such initial unbalance of the bridge circuit acting through transformer 27 is of such phase relation with respect to tube 61 that the tube is cut off, so that during the bridge balancing operation tube 61 is held at cutoff until the bridge has been balanced and fires only when such balancing operation has been carried very slightly beyond the balanced condition, with arm 24 moving in the upscale direction or clockwise as viewed in Fig. 1. In going through the balanced condition the phase of the detector current in the primary of transformer 27 reverses. When this happens the tube 61 fires, energizes relay coil 60, opens the upscale energizing circuit of motor 50 at the lower contacts of switch 57, and stops the motor. The upper contacts of the switch 57 also close and establish a new grid biasing circuit which maintains the tube conducting, so that the voting result just obtained cannot be altered by one or more voters now manipulating their voting devices. This connection connects the control grid to the tube cathode. To reset the vote pointer 34 and potentiometer arm 24 to zero, the operator moves switch 56 from the upper "Indicate" position to the lower or "Reset" position. The motor 50 is then energized through switch 59 and operates in the downscale direction to the zero scale position of the parts, whereupon limit switch 59 is opened automatically and the motor stops. Other equivalent controls for balancing the bridge automatically may be used for either direct or alternating current operation. It will be noted that when switch 56 is moved away from the "Indicate" position, it opens the plate circuit of the tube 61 and hence relay coil 60 is deenergized and its switch returns to the normal drop out condition represented at Fig. 1.

In Fig. 3 one of the individual voting devices such as is provided at the different voting stations I, II, etc. of Fig. 1 is represented in more detail, although the representation is somewhat diagrammatic. The exposed portion shows a dial having indications marked thereon. These markings include a graduated scale from 0 to 100 per cent in the clockwise direction, with the inscription "50–50" at the midpoint. This scale is of the order of 300 degrees in length. Slightly counterclockwise from the zero end of the scale is the indication "Off." The low and high portions of the scale are marked "No" and "Yes," respectively. The manually operated pointer knob 8 cooperates with these dial graduations and may be turned from the "Off" position clockwise around to the 100 per cent "Yes" position, and is preferably limited to this arc of rotation by suitable stops. The knob 8 is insulated from but mechanically connected to a contact arm 28 permanently electrically connected to the common wire 4 through a resistance 29. In the "Off" position arm 28 contacts with a contact 40 connected to wire 3. Between the "0" and "100" per cent positions the arm 28 contacts with a potentiometer resistance 30. The "0" end of this resistance 30 is connected through a resistor 31 to line 1 and the "100" end of resistance 30 is connected to line 7 through a resistor 32. Resistors 31 and 32 are equal and in most cases the resistances 30, 31 and 32 will all be equal. Between the "0" and "50–50" positions of pointer knob 8 contact arm 28 also connects with a contact sector 37, which may be referred to as the "No" sector, and which is connected to wire 2. Arm 28 contacts with another contact sector 38 referred to as the "Yes" sector between the "50–50" and "100" positions. The "Yes" sector is connected to wire 6. Between the "Yes" and "No" sectors at the "50–50" position arm 28 will connect with a contact 39 connected to line 5 referred to as the "50–50" contact. There is sufficient spacing between the "50–50" contact and the "Yes" and "No" sectors to prevent the arm 28 from making contact with more than one of these contacts at the same time. The pointer knob 8 indicates on the dial the corresponding position of the contact arm 28.

All of the several individual voting devices will be similar and will have similar resistances 29, 30, 31 and 32 similarly associated therewith.

The use of the individual voting devices is practically self-explanatory from their dial indications but the voters may be instructed as follows: Those who do not wish to vote at all on a given question will turn their pointer knobs to "Off." Those who are neutral or "on the fence" and wish to vote accordingly will turn their pointer knobs to "50–50." Those who desire to vote "No" will turn their pointer knobs to "No" and, if an opinion ballot is to be taken, at a point on the adjacent percentage scale which represents the degree of their "No" opinion. Thus, those violently opposed to the proposition will set their pointers at "0" on the "No" scale and those only mildly opposed will set their devices, say, at 40 or 30 along the "No" scale, meaning that, expressed in per cent, such voters are only 40 and 30 per cent, respectively, in favor of the proposition being voted upon. Similarly, those who desire to vote "Yes" will set their vote indicators along the "Yes" scale and at a point which represents their affirmative opinion. For instance, a voter who is three-fourths favorable will set his pointer at "Yes" 75 per cent, etc. Only one setting of all of the individual voting devices is required to take the four kinds of ballots identified as the percentage not voting, the percentage of those voting who are "on the fence," the percentage of those voting who are in favor of the proposition (this is the "Yes" and "No" vote, since the "No" vote is 100 percent less the "Yes" vote), and the opinion measurement ballot.

These four different ballots are possible with only one setting of each individual voting device because the necessary changes in connections therefor are accomplished by movement of the gang switch 12 at the control station to the four vote indicating positions. For each connection thus formed the bridge is adjusted until balanced and the voting results are successively indicated on the large dial 35 at the control station. The fact that the contact arm 28 of the individual voting devices, Fig. 3, may be resting on both the resistance 30 and some other one of the "Off," "No," "Yes," or "50–50" contacts at the same time does no harm because the circuits not being used in a particular ballot are open at the gang switch 12.

The large dial 35 of the master vote indicator at the control station is provided with a 100 per cent scale with "No" and "Yes" adjacent the zero and 100 per cent ends thereof, and in these respects may be considered like the individual vote dials except greatly enlarged and provided with graduations permitting it to be read down to one per cent by all voters from a distance. The position of the gang switch is also clearly indicated to all voters, and I prefer to provide a window 64 in the front of the master control casing wherein the indications "Opinion," "Vote," "50–50" and "Not voting" appear for the corresponding positions of the gang switch. Such indication of the position of the gang switch together with the position of the large pointer 34 on the large percentage dial 35 when the bridge is balanced for any particular type of ballot gives the result of such ballot. Thus, if the gang switch is in the "Not voting" position and the large pointer 34 stops at seven per cent in an automatic balancing operation, it means that seven per cent of those eligible to vote did not do so and had their individual vote indicators positioned at the "Off" position on contact 40.

In Fig. 4, I have represented somewhat schematically simplified connections for an "Opinion" ballot, showing two individual voting stations I and II and the master potentiometer. The voter at station I registers his opinion by positioning his potentiometer for only 32 per cent favorable, while the voter at station II votes 78 per cent favorable. The resistance sections of 30 above the two potentiometer arms 28 at stations I and II including resistances 31 connected in parallel to wire 1 constitute one arm of a bridge. The resistance sections of 30 below the arms 28 at stations I and II including resistances 32, but excluding resistances 29, connected in parallel to wire 7 constitute another arm of the bridge. The resistance portions of 23 above arm 24 including resistance 16 at the control station also connected to wire 1 through gang switch blade 1A constitute another arm of the bridge, and the resistance sections of 23 below arm 24 including resistance 17 at the control station connected to wire 7 through gang switch blade 7A comprise the remaining arm of the four-arm bridge. The source of supply furnished by transformer 22 is connected across two opposite corners of the bridge, wires 1 and 7; and the balance detector transformer 27 in series with parallel resistors 29 is connected between the other two opposite corners of the bridge through common wire 4. Adjustment of balancing arm 24 until no current flows in detecting transformer 27 balances the bridge, and then the position of indicator 34 on the dial 33 indicates the average opinion vote. It can be shown by complicated mathematics that if the resistance sections 30, 31 and 32 at the control stations are made equal and the resistance sections 16, 23 and 17 at the control station are made equal, and the variable portions 30 and 23 are uniform, the opinion result vote will be approximately the arithmetical average of the individual opinion votes when the bridge is balanced. This will be so regardless of the number of individual stations voting. Accordingly, I prefer to make the resistances 30, 31, and 32 each equal to 2000 ohms and the resistances 16, 23 and 17 each equal to 190 ohms.

The opinion result in the example given above will be 55 per cent "Yes." If desired, more weight may be given to the opinion vote than the arithmetical average. For instance, if the fixed resistances 16 and 17 and 31 and 32 were made only 10 per cent of their adjustable sections 23 and 30, respectively, more weight would be given to the extremes of opinion. For example, where the arithmetical average vote would be 75 per cent "Yes," the weighted opinion vote with such new values of resistances would be 87½ per cent "Yes." The apparatus may therefore be designed or made adjustable to suit the user in this respect. While the master potentiometer is used for all voting, the potentiometer resistances at the individual voting stations and the fixed resistances 16, 17, 31, and 32 are used only for opinion voting, and therefore, the design or adjustment of the apparatus for any desired emphasis opinion balloting does not interfere with the design for other balloting purposes.

Fig. 5 shows the simplified connections made by the gang switch for the straight "Yes" and "No" vote using the same voting positions for the vote indicators of stations I and II as were used in Fig. 4. The resistance sections 29 become the sole resistances in the voter's part of the bridge circuit and are in the upper or lower arm of the bridge, depending upon whether the corresponding individual vote is "No" or "Yes." The bridge is now balanced by necessary adjustment of the master potentiometer contact 24 and when balanced, the position of indicator 34 gives the percentage "Yes" vote. To obtain the percentage of persons voting but voting "50–50" the gang switch 12 is thrown to the "50—50" position. The simplified connections become as represented in Fig. 6 showing four voting stations, station I voting "No," station II voting "Yes," station III voting "50–50" and station IV "Not voting."

The connections are such that all of the resistances 29 for the "Yes" and "No" votes are connected in parallel in one arm of the bridge and the resistances 29 for the "50–50" votes are connected in another arm of the bridge, the remaining two arms being the sections of resistance 23 of the master potentiometer on opposite sides of arm 24. Thus, when the bridge is balanced, indicator 34 will indicate the percentage of all those voting who voted "50—50." To obtain the percentage of those not voting, the gang switch is now moved to the "Not voting" position. Line 3 becomes connected to line 18, Fig. 6, and the connection of line 5 is shifted from line 18 to line 20, so that all of the "Yes," "No," and "50–50" resistances 29 are connected in parallel in one vote arm of the bridge and balanced against all of the "Off" resistances 29 in the other vote arm of the bridge. Hence, when the master potentiometer resistance 23 has been adjusted to balance the bridge, the indicator thereof indicates the percentage of stations set at "Off."

It will be evident that the accuracy of any voting result will not be altered by usual variations in voltage of the source of supply. Also, it will be evident that the accuracy of the voting results is independent of the number of individual voting devices in use.

In using this apparatus, the equipment may be permanently installed in an auditorium, for example, or may be completely portable as explained. The master controller will generally be placed on a table on the speaker's platform with its dial facing the audience and attended by an operator. The operator will see that each person eligible to vote is provided with a voting device, and that all of such voting devices are connected to the gang switch as previously explained. All other voting devices that may be present are disconnected but any necessary additional voting devices may be distributed or connected up for late comers. The apparatus is connected to the source of supply 21 as by means of an ordinary wall plug. After a question has been discussed, the voters are instructed to vote thereon as desired in the manner previously described by positioning their individual voting devices. This they may do in secret and very quickly, as only one adjustment is required for all forms of balloting as previously explained. The operator will have his switch 56 set at "Reset" and the arm 34 of the vote indicator will be at zero. Now the "Opinion," "Vote," "50–50" and "Not voting" ballots or any one or more of them can be quickly obtained in succession. To take the "Yes-No" vote the gang switch is set on "Vote" and switch 56 moved to "Indicate." Motor 50 immediately drives arm 24 and pointer 34 clockwise until the bridge is balanced, and then the motor stops and pointer 34 indicates the result. This result cannot be altered by any one or more voters now changing their vote devices, because immediately the bridge is balanced the motor control is cut off. Of course, any vote may be taken over again if that is desired.

To take now an opinion vote the switch 56 is moved to "Reset" and the gang switch is moved to the "Opinion" position. As soon as the pointer 34 reaches zero, switch 56 is again moved to "Indicate" and the pointer 34 is driven forward until the bridge balances and the control cuts off. The "50–50" and "Not voting" ballots are similarly taken by similar operations with the gang switch in the appropriate positions. With the apparatus as built the motor 50 drives the arm 34 at such a speed that all four ballots may be obtained in less than one minute, although any ballot result indication may be allowed to remain as long as desired.

The apparatus may be otherwise used. For instance, suppose it becomes desirable to vote on two candidates for an office, whose names are John and William and that a majority vote of those present is required for an election. Those desiring to vote for John are instructed to position their voting devices to "No," those desiring to vote for William are instructed to position their voting devices to "Yes," and those who do not wish to vote for either to position their vote devices to "Off." The result of the "No," "Yes" vote will show which candidate received the most votes. For instance, if the indicator stops at 40, John received 60 per cent of the candidate votes, and the "Not voting" ballot can be used to see if it is a majority vote. Say the "Not voting" indication is 15; therefore, 85 per cent of those present voted and 60 per cent of 85 equals 51 per cent, so that John is elected. The voting is secret and is much quicker than is possible by a written ballot.

Often times in a meeting there are late arrivals. the individual voting apparatus described may be adapted for later arrivals by providing a reasonable number of individual voting stations connected in the circuit but with the indicator turned to "Off." Late arrivals may take up and use these extra voting devices without disturbing the meeting. It is, of course, necessary for the operator to know the number of unused voting stations connected in the system which have their indicators turned to "Off" because they will register in the "Not voting" count, but they may be readily taken into consideration by the operator if he knows the number of such idle voting stations connected in the system. Similarly, people who wish to leave a meeting early may simply turn their stations to "Off." Correct voting results will still be obtained if the operator knows how many people are present and how many stations are connected. If in doubt, the operator can ask all present to set their stations at the "Off" and if the indication is not 100 per cent, he can check vacant stations. Then by setting all to "Yes" the "No" vote reading gives the percentage of stations in use. Instead of having idle stations connected in the system, extra unused voting station units may be given to new arrivals and then plugged into the system and taken from those who leave early and disconnected from the system, in which case the individual voting station units would be adapted to be easily plugged in and removed from the system, for example, as indicated in Fig. 1, at 10 and 11. The system will give all voting results directly without the necessity of adjustment for connected but idle voting stations.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In an electrical voting system, a resistance bridge circuit having two resistance bridge balancing arms and two voting arms, the two voting arms comprising a plurality of similar resistance circuits connected in parallel, terminals for supplying said bridge circuit with electrical energy at points between the bridge balancing arms and the voting arms, vote controlling movable contactors associated with each of said parallel connected similar resistance circuits, a bridge balancing contactor associated with the bridge balancing arms, a bridge balance detector circuit connected between the bridge balancing contactor and the plurality of vote controlling contactors, the vote controlling contactors being manually individually movable along their associated resistance circuits thereby to determine the resistance relation in the two voting arms of said bridge, automatic means responsive to the current in the detector circuit for moving the bridge balancing contactor along its associated resistance to balance the bridge, and means operated with said bridge balancing operation for giving an indication representative of a composite voting result when said bridge is balanced.

2. In an electrical voting system, a resistance bridge circuit having two resistance bridge balancing arms and two voting arms, the voting arms comprising a plurality of similar resistance circuits connected in parallel, means for supplying said bridge circuit with operating potential at points between the balancing and voting arms, each of the plurality of similar resistance circuits and the bridge balancing arms comprising a potentiometer resistance section connected between two equal resistance sections, potentiometer contactors movable over each of said potentiometer sections, a bridge balance detector circuit connected between the contactor of the bridge balancing arms and the other contactors in parallel, each of said contactors having a movable indicator and stationary scale associated therewith graduated from 0 to 100 per cent for indicating the position of the contactor along the associated potentiometer resistance section, the contactors associated with the voting arm resistance circuits being individually manually adjustable for voting purposes.

3. In an electrical voting system, a resistance bridge circuit comprising a pair of bridge balancing resistance arms and a pair of voting arms, the voting arms comprising a plurality of similar resistance circuits connected in parallel, each such circuit as well as the circuit comprising the bridge balancing arms having three equal resistance sections connected in series relation, and each of the central resistance sections having a contactor movable thereover, a bridge balancing detector circuit connected between the bridge balancing arms contactor and all of said other contactors in parallel, an indicator moved with each contactor and a graduated scale for each indicator, said scales being graduated from 0 to 100 per cent to indicate the corresponding position of its contactor along the corresponding center resistance section, the contactor arms associated with the voting bridge arms being individually manually adjustable for voting purposes, and automatic means responsive to the current in the detector circuit for moving the bridge balancing arms contactor to balance the bridge and thereby producing an indication corresponding to the average indication of the other indicators.

4. An electrical voting system comprising a plurality of similar vote controllers, each having a resistance, a contactor adjustable on said resistance and a plurality of stationary contacts positioned to be engaged by said movable contactor in different voting positions thereof, circuit terminals to the ends of said resistance and to the several stationary contacts of each of said vote controllers, wires connecting the similar corresponding terminals of said vote controllers together, a master resistance potentiometer having a stationary resistance and a contactor movable thereover, a bridge balancing detector circuit connection extending from the movable contactor of the master potentiometer to the movable contactor of each of said voting controllers, similar resistors included in each of the last mentioned connections, switching means for selectively connecting different pairs of said wires across the master potentiometer resistance to form different resistance bridge circuits, means for energizing said bridge circuits, the contactors of the voting controllers being individually manually adjustable, and automatic means responsive to the current in the bridge balance detector circuit for adjusting the position of the master potentiometer contactor to balance the bridge circuit established by said switching means.

5. An electrical voting system comprising a plurality of similar voting controllers each having a movable contactor cooperating with a plurality of stationary contacts adapted to be engaged by the movable contactor in different voting positions, the different contactor positions representing different manners of voting on a question, wires for connecting corresponding contacts of all of the vote controllers in parallel, equal resistance connections for connecting all of said movable contactors in parallel to a common wire, a master resistance potentiometer having a movable potentiometer contact connected to said common wire, switching means for progressively connecting said master potentiometer across different pairs of the wires which connect the contacts of the voting controllers in parallel thereby establishing resistance bridge circuits corresponding to the several different manners of voting, a source of supply for energizing said bridge circuits, a bridge balancing detector in the common wire connection, and automatic means responsive to said detector for adjusting the master potentiometer to balance the established resistance bridge circuit and indicating the composite voting result as determined by the positions of the voting controller contactors.

6. In an electrical voting system, a voting controller comprising a movable contactor adapted to be moved to different positions representing "Not voting," "No," "50–50," and "Yes," corresponding stationary contacts engaged by said contactor in said different positions, means for indicating such different positions of said contactor, and a resistance continuously engaged by said contactor when moving over its "No," "50–50," "Yes," range of movement for the purpose of permitting an expression of degree in voting and a scale graduated from 0 to 100 per cent for indicating the position of the contactor along said resistance, the 50 per cent point of said scale corresponding to the "50–50" position of said contactor.

7. An electrical voting system comprising a plurality of similar voting controllers each having a movable contactor with "No," "50–50" and "Yes" vote indicating positions, stationary contacts engaged by said contactor in said different vote indicating positions and a graduated resistance continuously engaged by said contactor in its movement between said different vote indicating positions for expression of opinion voting, all of the corresponding resistances, contacts and contactors of said voting controllers being connected in parallel with similar resistors connected in the movable contactor connections, said parallel connected voting controllers comprising two arms of four arm resistance bridges representative of "No-Yes," "50–50" and opinion voting, the relative resistance adjustment of such two arms for each bridge depending upon the relative positions of the several contactors, a master resistance potentiometer having a graduated resistance and a movable contactor with "No," "50–50," and "Yes" indicating positions comprising the two additional resistance arms of said four arm bridges, switching means and connections for connecting said master potentiometer to said parallel connected voting controllers for progressively completing four arm resistance bridges corresponding to "No-Yes," "50–50" and opinion voting, means associated with said switching means for designating the bridge connections as and when established thereby, a source of supply for energizing said bridges, and automatic means including a bridge balance responsive means for adjusting said master potentiometer to balance each of the four arm bridges established by said switching means and indicating the composite voting results for the "No-Yes," "50–50" and opinion voting adjustments of the voting controllers.

8. An electric voting system comprising a plurality of similar voting controllers, each having a movable voting contactor, a resistance over which the contactor is movable and a plurality of stationary contacts which may be engaged by the contactor in different positions of adjustment, circuit terminals to the two ends of the resistance and to each of the contacts and to the movable contactor, and a resistor contained in the circuit terminal lead to the movable contactor, wires connecting the corresponding circuit terminals of the several similar vote controllers in parallel, a resistance bridge balancing potentiometer having a movable contactor connected to the movable contactor circuit terminal wire of the voting controllers, a switch for progressively connecting different selected pairs of the remaining circuit terminal wires of the voting controllers across the resistance bridge balancing potentiometer to establish different resistance bridge circuits corresponding to different voting positions of the vote controller contactors, said bridge balancing potentiometer being designed to balance each of the resistance bridge circuits so established, a source of supply for such bridge circuits connected across said potentiometer, bridge balancing detector means in the circuit to the movable contactor of said potentiometer, automatic means responsive to the current in such detector circuit for moving the potentiometer contactor to bridge balancing position and an indicator movable with the potentiometer contactor for indicating composite voting results as determined by the various positions of the several voting controller contactors when the established bridge circuit is balanced.

9. In an electrical voting system, a master resistance potentiometer adapted for use in combination with resistance voting circuits as the balancing means for resistance bridges, comprising a graduated resistance, a contactor movable over said resistance, a reversible motor for moving said contactor back and forth over said resistance, a manual energizing and reversing switch for said motor having closed positions for forward and reverse operation of said motor, an automatic switch in series with the forward motor energizing circuit established by said manual reversing switch, a relay which when energized opens said automatic switch, bridge balance detector means and means responsive thereto during a balancing operation of said bridge when the motor is operating in the forward direction for energizing said relay when the bridge becomes balanced to stop the motor, and means responsive to the energizing operation of said relay to remove it from the control of the detector means, said relay being energized through the manual switch only when in the forward motor operating position.

THEODORE A. RICH.

REFERENCES CITED

The following references are of record in the file of this patent:

UNITED STATES PATENTS

| Number | Name | Date |
|---|---|---|
| 2,178,314 | Saxe | Oct. 31, 1939 |
| 2,341,678 | Wickes | Feb. 15, 1944 |
| 2,443,098 | Dean | June 8, 1948 |